US011540212B2

(12) United States Patent
Silverman et al.

(10) Patent No.: US 11,540,212 B2
(45) Date of Patent: Dec. 27, 2022

(54) LOW-OVERHEAD CHANNEL SOUNDING IN WI-FI7 BASED ON PARTIAL BAND CHANNEL ESTIMATION

(71) Applicant: Cisco Technology, Inc., San Jose, CA (US)

(72) Inventors: Matthew Aaron Silverman, Shaker Heights, OH (US); Ardalan Alizadeh, Milpitas, CA (US); Khashayar Mirfakhraei, Milpitas, CA (US); Gautam D. Bhanage, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 17/145,252

(22) Filed: Jan. 8, 2021

(65) Prior Publication Data
US 2022/0225217 A1  Jul. 14, 2022

(51) Int. Cl.
| | | |
|---|---|---|
| *H04W 4/00* | (2018.01) | |
| *H04W 48/16* | (2009.01) | |
| *H04W 48/20* | (2009.01) | |
| *H04W 72/04* | (2009.01) | |
| *H04W 84/12* | (2009.01) | |
| *H04W 88/08* | (2009.01) | |

(52) U.S. Cl.
CPC ........... *H04W 48/16* (2013.01); *H04W 48/20* (2013.01); *H04W 72/0406* (2013.01); *H04W 84/12* (2013.01); *H04W 88/08* (2013.01)

(58) Field of Classification Search
CPC . H04W 48/16; H04W 48/20; H04W 72/0406; H04W 72/04; H04W 72/042; H04W 28/04; H04W 88/08; H04L 5/0007

USPC .......................................................... 370/329
See application file for complete search history.

(56) References Cited

U.S. PATENT DOCUMENTS

| | | | |
|---|---|---|---|
| 9,252,991 B2 * | 2/2016 | Zhang | ................. H04B 7/0452 |
| 2012/0033592 A1 | 2/2012 | Kim et al. | |
| 2013/0322280 A1 | 12/2013 | Pi | |
| 2014/0348097 A1 | 11/2014 | Park et al. | |
| 2016/0295581 A1 | 10/2016 | Ghosh et al. | |
| 2019/0253282 A1 | 8/2019 | Hadaschik et al. | |
| 2019/0260553 A1 | 8/2019 | Porat et al. | |
| 2019/0342885 A1 | 11/2019 | Chun et al. | |

FOREIGN PATENT DOCUMENTS

| | | |
|---|---|---|
| WO | WO2017004546 | 1/2017 |
| WO | 2021263053 A1 | 12/2021 |

OTHER PUBLICATIONS

International Search Report and Written Opinion issued in corresponding International Patent Application No. PCT/US2022/011472, dated Apr. 19, 2022.

\* cited by examiner

*Primary Examiner* — Temica M Beamer
(74) *Attorney, Agent, or Firm* — Merchant & Gould P.C.

(57) ABSTRACT

Optimal determination of a Wireless Local Area Network (WLAN) sounding method and system may be provided. An Access Point (AP) selects a subchannel for the partial sounding. The AP then sounds the selected subchannel. A client station responds with Channel State Information (CSI). The AP can receive the CSI, from the client station, in response to the sounding. Based on the CSI from the selected subchannel, the AP extrapolates the CSI to determine predicted CSI for a wider bandwidth channel.

18 Claims, 6 Drawing Sheets

LOW-OVERHEAD CHANNEL SOUNDING IN WI-FI7 BASED ON PARTIAL BAND CHANNEL ESTIMATION

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller.

To function in the WLAN, client devices are identified and can be located. The APs in the WLAN can use a procedure, referred to as sounding, to identify and locate the client devices. Sounding includes sending a reference signal to a client device, by the AP, and receiving Channel State Information (CSI) feedback from the client device.

With newer WiFi standards, the overhead expense for doing sounding is very large. Also, as the duration of the sounding procedure increases, channel measurements become useless, since the channel varies significantly between the signals from the AP to the following data transmission. Thus, the measured channel state becomes outdated, which makes the sounding procedure ineffective.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Optimal determination of a WLAN sounding method and system may be provided. An AP selects a subchannel for the partial sounding. The AP then sounds the selected subchannel. A client station responds with CSI. The AP can receive the CSI, from the client station, in response to the sounding. Based on the CSI from the selected subchannel, the AP extrapolates the CSI to determine predicted CSI for a wider bandwidth channel.

Both the foregoing overview and the following example are examples and explanatory only, and should not be considered to restrict the disclosure's scope, as described and claimed. Furthermore, features and/or variations may be provided in addition to those described. For example, example of the disclosure may be directed to various feature combinations and sub-combinations described in the example.

Example

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

To conduct a sounding procedure, an AP can transmit a Null Data Packet (NDP) Announcement (NDPA) to one or more client devices (also referred to as stations (STAs)) to notify the STAs that a reference signal is to follow. The AP then sends this reference signal, in a Short Inter-Frame Space (SIFS) after the NDPA, in the form of Null Data Packets (NDPs). Thus, the AP broadcasts NDPs in the SIFS after the NDPA. The NDPs can be used by the STAs to assess the channel. The NDP can include High Efficiency (HE) —Long Train Field 3 (LTF3) (HE-LTF3) of duration 7.2, 8, or 16 us for each Spatial Stream (SS). Having received the NDP, the STAs reply with Beamforming Reports (BFR) either sequentially or in parallel thanks to Orthogonal Frequency Division Multiple Access (OFDMA) uplinks.

The aspects provided herein provide a low-overhead sounding mechanism that may include two procedures. The first phase can include the mechanism for finding the minimum bandwidth that can be supported for sounding based on the metrics that can be collected from intermittent normal/full band sounding. From the minimum bandwidth determination, the mechanism can then identify the best channel to sound based on the channel access and contention. In the second phase, the mechanism can sound, in the partial band, and extrapolate the channel estimation, from that partial band, for the entire band.

As introduced above, for leveraging the channel prediction mechanism, aspects herein can include a method to determine the minimum required bandwidth in WLAN systems that can be extrapolated into the entire bandwidth CSI. This method can include one or more of the following stages. First, the AP can sound on the entire bandwidth. In this stage, the NDP is sent over the entire bandwidth, e.g., 320 MHz. The CSI of clients, responding to the NDP with a BFR, can be collected based on the standard procedure.

Second, the AP can find one or more tuples for the N number of paths. A tuple is a parameter of the CSI, e.g., a frequency-independent phase that captures whether the path is direct or reflected, the path attenuation from the path, a distance travelled by the signal along the path to the antenna, the Angle-Of-Arrival (AOA) of the signal along the path, etc. The parameters of the time domain channel can be extracted from the full band CSI. There are numerous tuples in the CSI, For example, there can be N×K×C×4 tuple values, where N is the number of paths, K is the number of AP antennas, C is the number of clients, and 4 represents the number of separate parameter types received. For example, there would be 1280 tuple values for five (5) paths, 16 antenna, four (4) clients, and four (4) types of tuples.

Third, from the tuple information, the AP can find the time delay of various paths: To be able to calculate the required partial bandwidth that will be used for extrapolating or re-generating the channels, the AP can evaluate the estimated distance that each path is travelling, instead of converting to actual time. There may be two processes for determine the estimated distance. First, the distance in the tuples can be sorted. Then, the difference between distances may be calculated between the pairs of distances in the sorted list. Then, the AP can determine the smallest difference in these calculations. In a second process, the average difference is calculated for all differences calculated above. The average difference is then determined to by the minimum value. This difference calculation helps identify what are the minimum delay separations between reflectors, in the environment, as detected between the AP and each STA that can be estimated with a 320 MHz bandwidth.

Fourth, the AP can determine the minimum required bandwidth, for the partial band sounding, based on the minimum distance difference metric calculated in the previous stage. The minimum required bandwidth can be determined to select the minimum bandwidth that gives enough resolution to distinguish two close signal peaks in the time delay profile. In implementations, to determine the bandwidth, the AP inverses the minimum time delay and can then find the closest larger bandwidth. For example, if the minimum delay between paths is 32 ns, the required bandwidth is 1/32 ns, which equals 31.25 MHz. The next larger division of the bandwidth is 40 MHz, and thus, the AP selects to use a 40 MHz channel for the partial band soundings.

Finally, the AP can conduct the partial band soundings. First, the AP determines a number and which subchannels to use for the sounding. The 40 MHz minimum bandwidth may be formed from two 20 MHz subchannels. The clients can be associated to a large band, and thus, the selected subchannel can include a primary 20 MHz channel. If the primary 20 MHz channel were not chosen, at least some clients may not be able to detect the NDPs. The channels can be selected such that maximum diversity over the frequency is achieved by selecting subchannels with maximum frequency separation. In Inverse Fast Fourier Transform (IFFT), zeros can be padded in between for separation.

The AP can set a timer that can trigger the partial band sounding to re-evaluate the channels in terms of the minimum required bandwidth. This time interval can be considered whether per client or for the overall network. It should be noted that the small changes in the location of client may cause significant changes on the actual CSI. However, this algorithm re-estimates the reflected paths' travelling time, which does not change significantly with small movement of client antennae.

The sounding can be done in the selected subchannels in every sounding interval. The tuple parameters of the entire channel are then estimated based on the partial band CSI, and the CSI can be predicted (or extrapolated) for other subchannels.

The above method may not require more frequent soundings and a sounding interval for the partial band may be about the same time (e.g. 50 ms) that is used for the entire bandwidth for updating the beamforming. Benefits of the aspects herein are at least two-fold. First, when the part of the entire band is being sounded, the risk of contention and channel access in a dense wireless environment is lower. Second the overhead of sending back the BFR is reduced. Indeed, sounding half of the entire band necessarily reduces the CSI report by half and the channel usage and sounding delay can be reduced significantly.

The aspects herein can also be applicable in sounding in multi-AP coordination scenarios. Sounding in multi-AP coordination can entail a very large amount of signaling and processing overhead. Using the methods herein can help to greatly reduce that amount of overhead. Further, the aspects herein can also be used in combination with the other sounding optimization techniques, e.g., tone interleaving and Orthogonal Sequence-based Reference Signal (OSRS).

Figure 1:
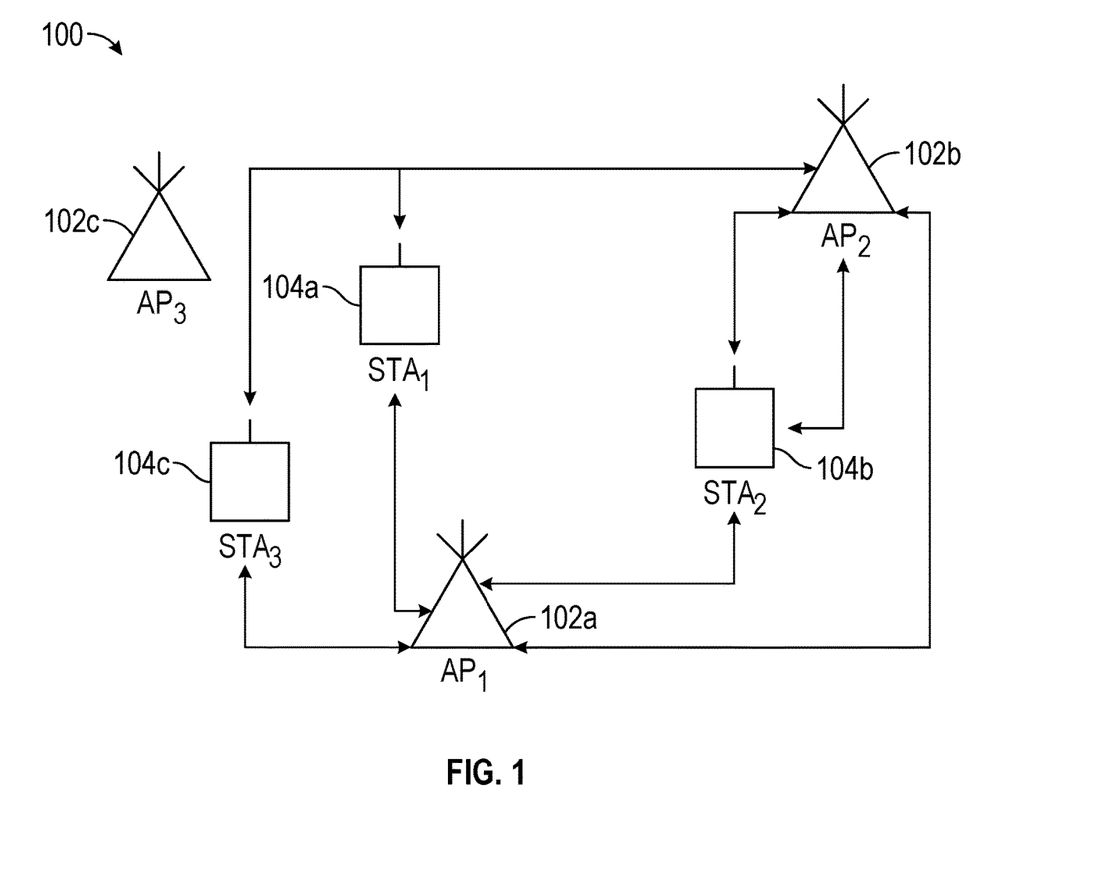
FIG. 1 is a block diagram of wireless network environment in accordance with aspects of the present disclosure.

A wireless environment 100 may be as shown in FIG. 1. The wireless environment 100 can include a WLAN, which may be referred to as WLAN 100, network 100, wireless environment 100, etc., and which can include one or more nodes, e.g., APs 102a, 102b, and/or 102c. The wireless environment 100 shows just three APs 102, but the wireless environment 100 can include two or more APs 102. APs 102 can function in a multi-AP coordination environment. Therefore, the APs 102 can communicate with each other to conduct operations in concert.

The APs 102 may be in communication with one or more client stations 104a-104c, which may also be referred to simply as clients 104 or simply as stations 104. The stations 104 may be physically dispersed through a physical area covered by APs 102 of the WLAN 100. The stations 104 and the APs 102 may be wireless devices, as described in conjunction with FIG. 6B and may be computing systems, as described in conjunction with FIG. 6A. The network 100 can be controlled by a controller (not shown), e.g., a WLC, a network controller, etc. The controller may be a computer system, wireless device, and/or another device, as described in conjunction with FIGS. 6A and 6B.

As stated above and as shown in FIG. 1A, the wireless network 100 may comprise Wi-Fi APs 102 (e.g., first AP 102a and/or second AP 102b) that may be configured to support a wireless (e.g., Wi-Fi) network 100. The APs 102 may comprise a physical location where a user, operating a client station 104, may obtain access to a wireless network 100 (e.g., Internet access), using Wi-Fi technology, via a WLAN using a router connected to a service provider.

In another example(s) of the disclosure, rather than APs 102, devices may be used that may be connected to a cellular network that may communicate directly and wirelessly with end use devices (e.g., a client station device 104) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client station devices 104 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of the wireless network 100 (e.g., WLC, first AP 102a, second AP 102b, client devices 104a-104g, etc.) may be practiced in hardware, in software (including firmware, resident software, microcode, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 6A and 6B, the elements of wireless network 100 may be practiced in a computing device 600 and/or wireless device 630.

Figure 2:
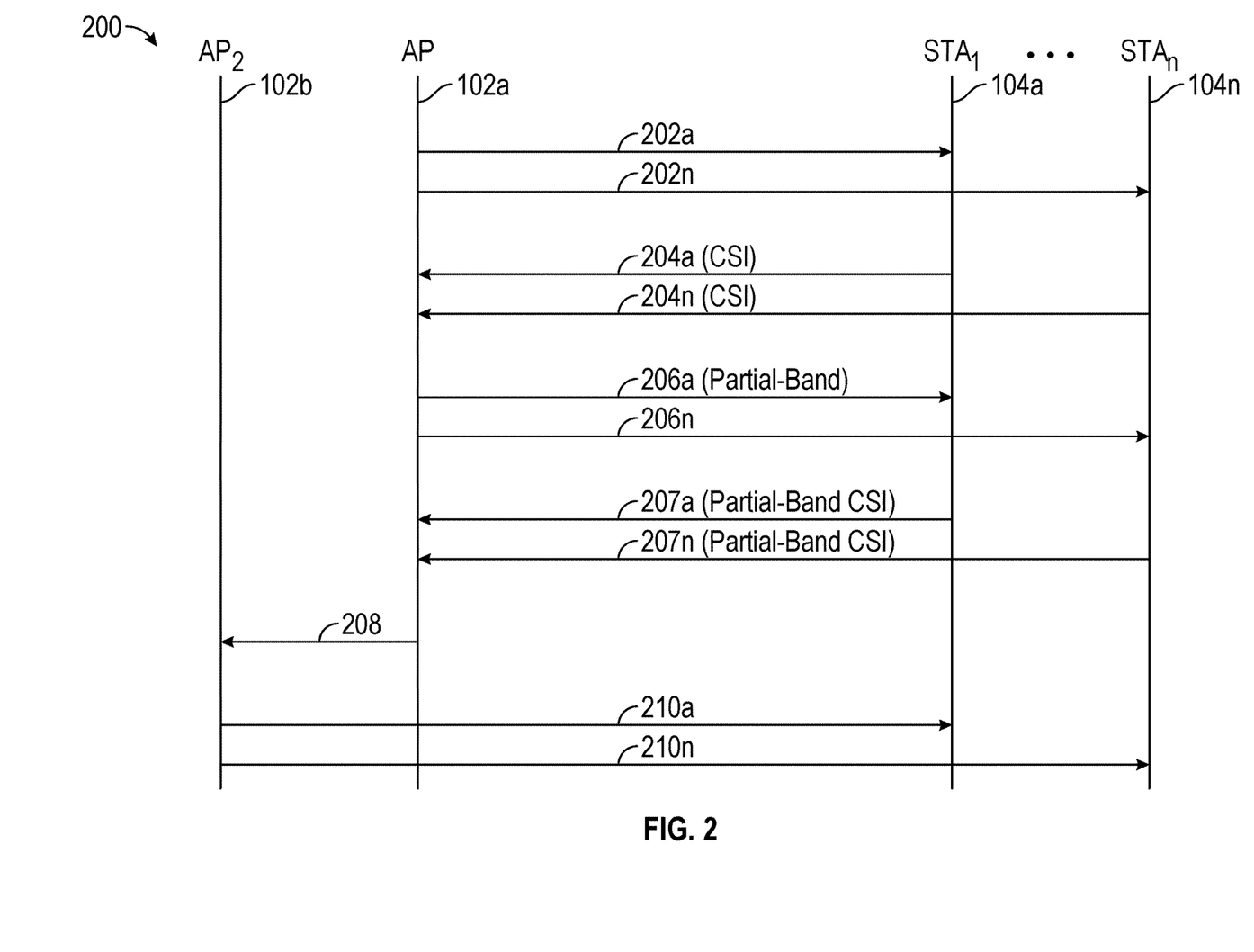
FIG. 2 is a signaling or signpost diagram of a signaling process for sounding channels in accordance with aspects of the present disclosure.

An implementation of a signaling process 200 may be as shown in FIG. 2. A first AP1 102a can begin a sounding process by sounding the full band to one or more stations 104a through 104n. The sounding process can include sending NDPAs to the one or more stations 104a-104n. The NDPA signals may be included in signals to 202a-202n. After the NDPAs, the AP 102a can send NDPs, which may be broadcast in a SIFS. The AP 102 can send the NDPs in signals 202a-202n to the stations 104a through 104n.

In response to the NDPs in signals 202a-202n, the stations 104a through 104n can record information about the received signals and send CSI information back to the AP 102a in signals 204a-204n. The CSI information may be included in a BFR from each client 104. This CSI information may then allow the AP 102a to determine the amount of bandwidth needed to do partial sounding and which channels to sound. From these determinations, the AP 102a can send the partial band sounding signals 206a-206n.

These partial band signals 206a-206n may be a portion of the overall bandwidth and may use the similar NDPAs/NDPs in those partial bands or subchannels. The signals 206a-206n can be sent to the stations 104a through 104n, which can return BFRs for those sounding in the subchannels, as signals 207a-207n. Any information received back from the stations 104a through 104n may be used to determine the movement of the client 104 or enable other functions of the AP 102a.

In multi-AP coordination or other types of cooperation with another AP 102b, the AP 102a can send CSI to the AP 102b. Signal 208 provides CSI about the sounding of the stations 104a through 104n from AP1 102a to AP2 102b. From this CSI, AP2 102b can broadcast signals 210a-210n, which may also be in a partial band. The signals 210a-210n can be sent to the same or different stations 104a through 104n. These partial band soundings, from AP2 102b, can thus be broadcast without the second AP2 102b having to sound the entire bandwidth as completed with the first AP1 102a because the second AP2 102b has benefitted from the first AP1 102a already conducting those operations. The CSI from signals 204 and any response in signals 207 is provided to the second AP2 102b. In this way, and multi-AP coordination can realize a reduction in overhead for soundings from the second AP2 102b.

Figure 3:
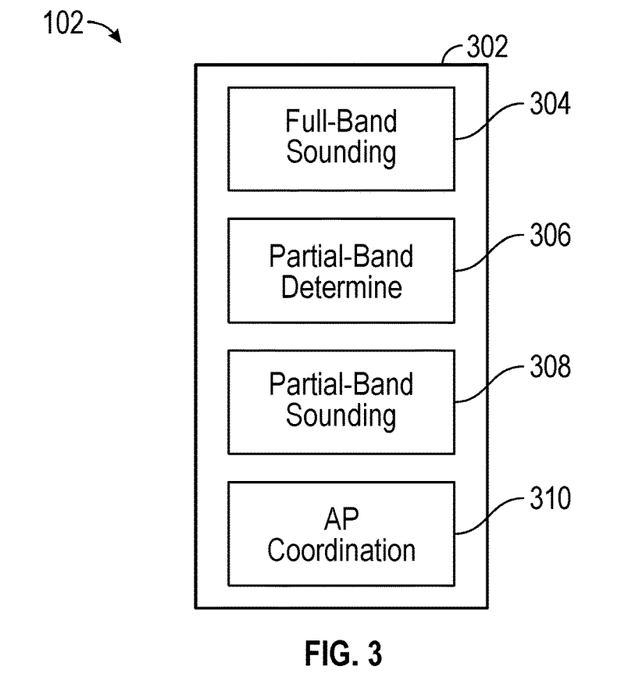
FIG. 3 is a block diagram of an AP antenna array in accordance with aspects of the present disclosure.
Figure 6A:
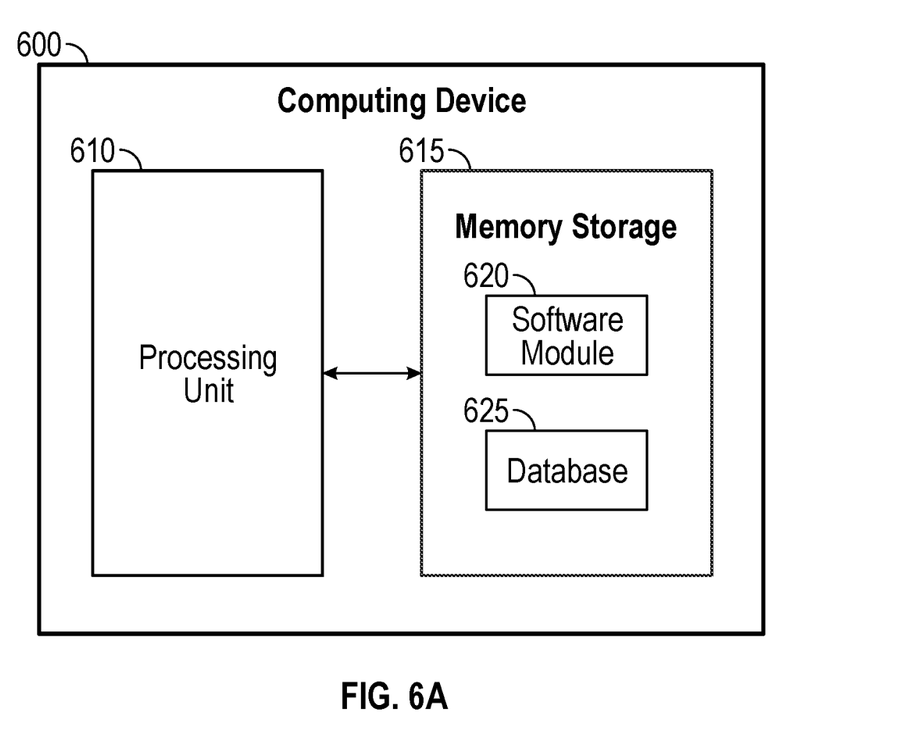
FIG. 6A is a block diagram of a computing device in accordance with aspects of the present disclosure.

An implementation of one or more components, associated with the APs 102, may be as shown in FIG. 3. The APs 102 can include components 302, which may be part of or executed as part of the computing system 600 as is shown in FIG. 6A. These components 302 can include one or more of, but are not limited to, a full band sounding component 304, a partial band determiner 306, a partial band sounding component 308, and/or an AP Coordination component 310.

The full band sounding component 304 can sound the full bandwidth of any or all channel(s) or path(s) being sent or received between an AP 102 and one or more STAs 104. Full band sounding includes the standard procedures used for sounding channels to different stations 104. Thus, the full band sounding component 304 can send signals 202. The full band sounding component 204 can also receive the CSI in signals 204, from the various stations 104. This full band sounding component 304 may then pass the channel state information to the partial band determiner 306.

The partial band determiner 306 can determine which partial band to use for partial band sounding. The partial band determiner 306 can conduct a selection of the amount of bandwidth required for the partial band soundings, based on one or more algorithms as provided hereinafter in FIGS. 4 and 5. The partial band determiner 306 can also select which subchannels may be used for partial band sounding. This bandwidth and/or subchannel information may be provided then to the partial band sounding component 308.

The partial band sounding component 308 can conduct the partial band sounding, by sending signals 206 and receiving BFR responses 207 back from STAs 104. Partial band sounding may occur on one or more subchannels rather than the entire bandwidth. In this way, the partial band sounding component 308 can conduct sounding differently than the full band sounding component 304.

Multi-AP coordination component 310 can coordinate with another AP 102, for example, AP2 102b, to provide or receive CSI or other information to or from that AP2 102b. The provided CSI may allow the second AP2 102b to conduct partial band soundings, for example, sending signals 210 without having to do full band soundings, e.g., 202. In this way, the AP coordination component 310 can allow for more streamlined soundings from the APs that are in a multi-AP coordination agreement and reduce the overall overhead of the WLAN 100.

Figure 4:
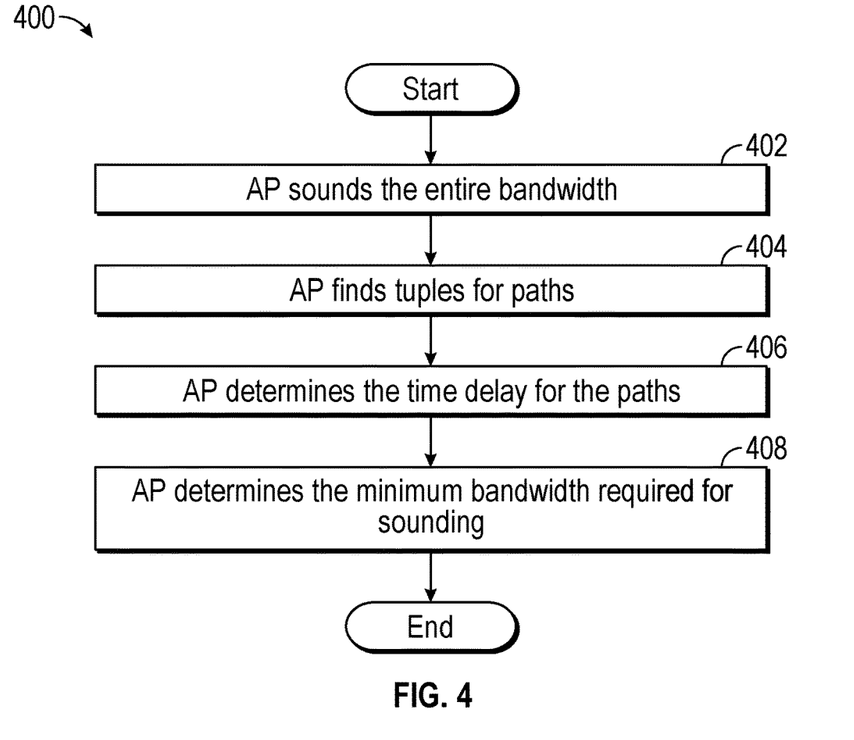
FIG. 4 is a flow chart of a method for determining minimum bandwidth for channel sounding in accordance with aspects of the present disclosure.

Referring now to the method 400 of FIG. 4, the method 400 can provide for determining a minimum bandwidth needed for sounding, in accordance with aspects of the disclosure. The method 400 can start with a start operation and can end with an end operation. The method 400 can include more or fewer stages or can arrange the order of the stages differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, data structures, etc. described herein.

AP 102 can sound the entire bandwidth, in stage 402. Full band sounding component 304 can sound the entire bandwidth of a channel(s) between an AP 102 and a station 104. This full band sounding may include signals 202, sent to one or more stations 104. This full band sounding may send an NDPA and then follow the NDPA with a NDP sent in the SIFS after the NDPA. The AP 102 may receive the CSI, for example, in one or more BFRs. The responses from the STAs 104 may be received as signals 204. The CSI may be provided to the partial band determiner 306.

Channel estimation of the entire bandwidth or baseband channel can be governed by the following algorithm:

$$h_i = \sum_n^N \left( a_n e^{-j2\pi \frac{d_n}{\lambda} + j\phi_n} \right) e^{-j2\pi \frac{il\cos\theta_n}{\lambda}}$$

In the above equation, $\theta_n$ is the AOA of the signal along path n, $d_n$ is the distance travelled by the signal along path n to the first antenna, l is the pairwise separation between antennas on the base station, $\lambda$ is the wavelength, a_n is the path attenuation from n-th path, and $\phi_n$ is a frequency-independent phase that captures whether the path is direct or reflected. Knowledge of at least some of the parameters, e.g., the tuples, in this equation for a partial band can help estimate the same tuples in the entire band. For example, a_n, $\phi_n$, $\theta_n$, and $d_n$ may be extrapolated from the partial band to the entire baseband. These example tuples may be frequency-invariant and can provide knowledge of channel estimation, $h_i$ in one frequency and then regenerate/predict $h_j$ in another frequency.

The AP 102 can then find tuple(s) for the one or more paths, in stage 404. The partial band determiner 306 can extract the tuple(s) from the CSI received in signals 204. Processes can be based on time-domain CSI (e.g., IFFT of frequency domain CSI) and may solve an optimization problem to minimize the error between the estimated channels based on estimated tuples. In some implementations, a machine-learning algorithm can solve the optimization problem and can predict the channel for other antennas.

As mentioned above, the tuple(s) can include one or more of, but is not limited to, the frequency independent phase that captures whether the path is direct or reflected, AOA of the signal along the path, the distance traveled by the signal along the path to a first antenna, and/or a path attenuation from the path. These four tuples may be extracted from the various paths. A path is a communication link between AP 102 and a station 104. Thus, for every AP 102 there can be parameters for the time domain channel extracted from the full band channel state information.

The number of values in the channel state information, extracted by the full band sounding component 304, can be governed by the number of n paths multiplied by the number of received antennas K, multiplied by the number of clients, and then multiplied by the number or types of tuples (e.g., the four tuples). Thus, for example, if there are five paths, 16 antennae, four clients, and four tuples, there will be 1280 values extracted from the CSI. This CSI information may be temporarily stored by the partial band sounding component 308 or the full band sounding component 304.

An AP 102 can then determine a time delay for the paths, in stage 406. The partial band determiner 306 may then determine time delay for the path(s). This time delay can be estimated by the partial band determiner 306. The time delay is used to determine the minimum amount of bandwidth needed for the partial band sounding. This time delay can be calculated by first sorting the distance the signal traveled for each path and for each client 104. Then, the difference in time delays can be calculated from these distance by subtracting the distance of one path from the distance of the next distance in the sorted list. These calculations attempt to find the minimum value of the distance between the two entries in the sorted list. All the distance pairs, in the sorted list, may be subtracted until the minimum distance or minimum differences found between two distances is determined. In another implementation, the determined differences, as calculated above, may then be averaged. This average may then be reflected as the minimum distance. The minimum distance difference can then be modified into a time by multiplying by the speed of the signal, e.g., the speed of light. From this time delay, the partial band determiner 306 can determine a minimum bandwidth needed for doing the partial band sounding.

The AP 102 can then determine the minimum bandwidth required for partial band sounding, in stage 408. The partial band determiner 306 can find the minimum required bandwidth based on the minimum distance/time delay determined, in stage 406. The minimum bandwidth is that bandwidth that has a high enough resolution to distinguish between two peaks in the time delay profile based on the distance provided previously. In one implementation, the minimum bandwidth is determined by inverting the minimum time delay derived in stage 406, and then finding the closest larger subchannel bandwidth subdivision. For example, if the minimum time delay determined in stage 406 is 32 ns, then the required bandwidth would be 1/32 ns, which equals 31.25 MHz. As there is no channel subdivision of 31.25 MHz, the next largest channel subdivision is 40 MHz (e.g., composed of two 20 MHz subchannels). As such, 40 MHz is the minimum bandwidth required to give proper resolution for the partial band sounding.

Figure 5:
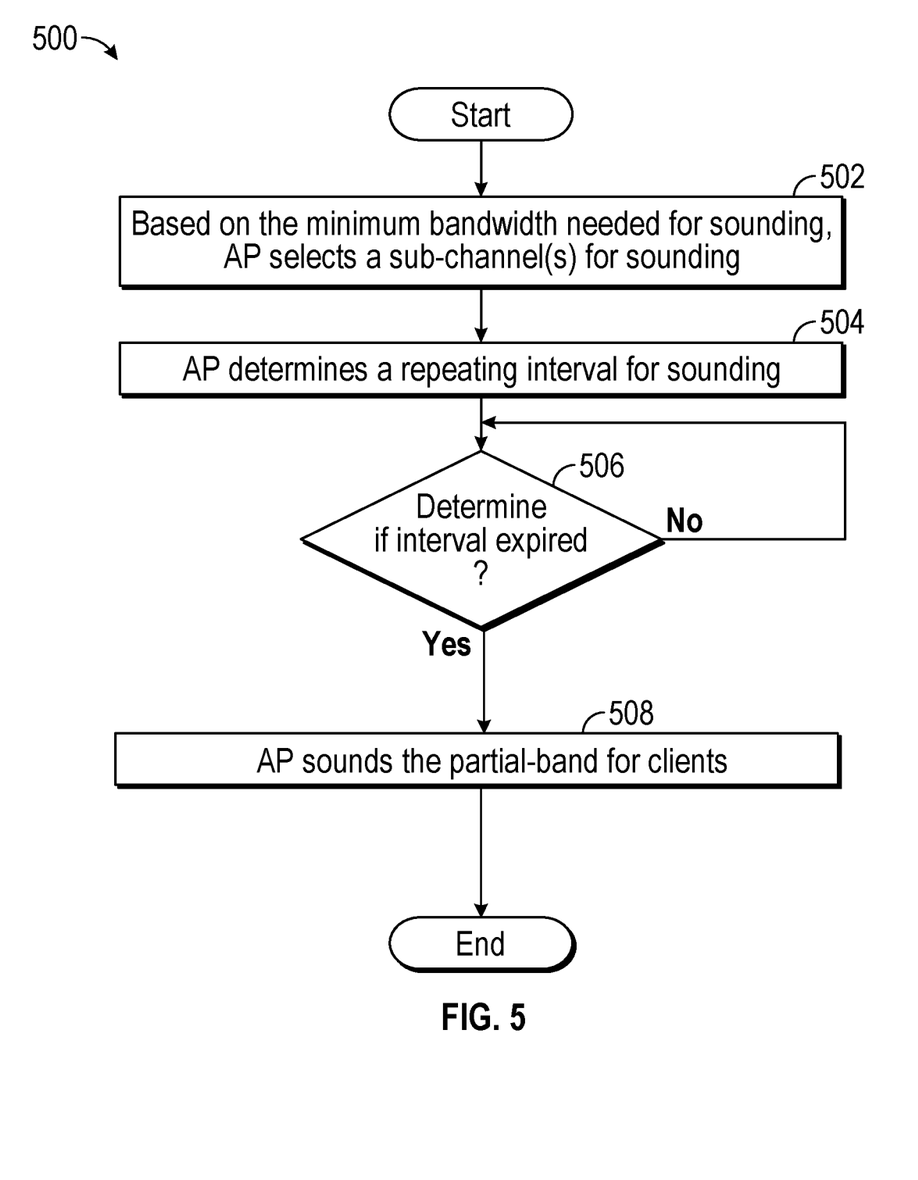
FIG. 5 is a flow chart of a method for sounding subchannels in accordance with aspects of the present disclosure.

An implementation of a method 500 for sounding in a partial band may be as shown in FIG. 5, in accordance with aspects of the disclosure. The method 500 can start with a start operation and can end with an end operation. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

Based on the minimum bandwidth needed for the partial band sounding, as calculated in method 400, AP 102 can select one or more subchannels for the partial band sounding, in stage 502. The partial band determiner 306 can select the one or more subchannels required to do the partial band sounding. The number of subchannels selected is based on the amount of bandwidth in each subchannel multiplied by the number subchannels needed to provide more bandwidth than the minimum required bandwidth, as determined in method 400. For example, if 40 MHz of bandwidth is required to do the partial band sounding, the partial band determiner 306 can choose two 20 MHz channels to do the partial band sounding. These 20 MHz subchannels may be extracted from the 160 MHz full bandwidth.

Which channels to select may also be determined by the partial band determiner 306. For example, the partial band determiner 306 can choose a primary and secondary channel in the middle of the 160 MHz bandwidth range. These subchannels are selected in the middle of the bandwidth range to provide maximum diversity over the entire full bandwidth frequency range. Thus, the partial band determiner 306 can select the subchannels for maximum frequency separation. This choice of subchannels may then be provided to the partial band sounding component 308.

The AP 102 may also determine a repeating interval for the sounding, in stage 504. The partial band determiner 306 can set the repeating interval for the sounding. The repeating interval can generate a timer that triggers the reevaluation of the subchannels. The time interval can be chosen per client 104 or based on the entire network of clients 104. Small changes in location of the client(s) can cause significant changes in CSI. However, the algorithms above can determine the sounding needs to re-estimate the sounding with the reflected past traveling time, which does not significantly change based on small movement of client antennae. Thus, the interval timer can be set at a frequency or period that is larger than may be needed to adjust to changes in small movement of the clients 104. This timing interval is also sent to the partial band sounding component 308.

The AP 102 can then determine if the timing interval has expired, in stage 506. The partial band sounding component 308 can monitor the time interval clock. Once the clock expires, the partial band sounding component 308 can determine that a partial band sounding is required. Thus, once the timing has expired, the method 500 proceeds "YES" to stage 508. However, if the time interval has not expired, the method 500 proceeds "NO" back to continuing to wait for the interval to expire.

In stage 508, the AP 102 sounds the partial band for one or more clients 104. Thus, the partial band sounding component 308 can sound the subchannels chosen by the partial band determiner 306, after the sounding interval. The tuple(s), e.g., the four tuples described above, or parameters from the channel are estimated for the partial band CSI. This partial band CSI can be extrapolated or used to predict the CSI or channel estimation for the other subchannels or the entire wide channel. Thus, based on the partial band channel sounding information, the partial band sounding component 308 can determine the channel state information or extrapolate that information for the entire channel. This information may then be used to update the beamforming requirements of the AP 102. If the partial band has been sounded the method 500 may proceed back to waiting for the interval time or back to stage 502. In this way, the amount of bandwidth or resources required to do the sounding is greatly reduced. Further sounding delay is also significantly reduced. However, the channel state information for the entire band is provided.

This partial band sounding may also be used in multi-AP coordination. In this way, the one or more APs 102a may share channel state information from the partial band, or conduct partial band sounding at some APs 102 for one or more clients 104. The partial band CSI may then be used by multiple APs 102, which can create overall network savings for overhead.

FIG. 6A shows computing device 600. As shown in FIG. 6A, computing device 600 may include a processing unit 610 and a memory unit 615. Memory unit 615 may include a software module 620 and a database 625. While executing on processing unit 610, software module 620 may perform, for example, processes for changing the beamwidth for some operation in Multi-AP coordination, as described above with respect to FIGS. 1-5. Computing device 600, for example, may provide an operating environment for the controller, the APs 102, the clients 104, or the other devices, however, the controller, APs 102, the clients 104, and other devices may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Figure 6B:
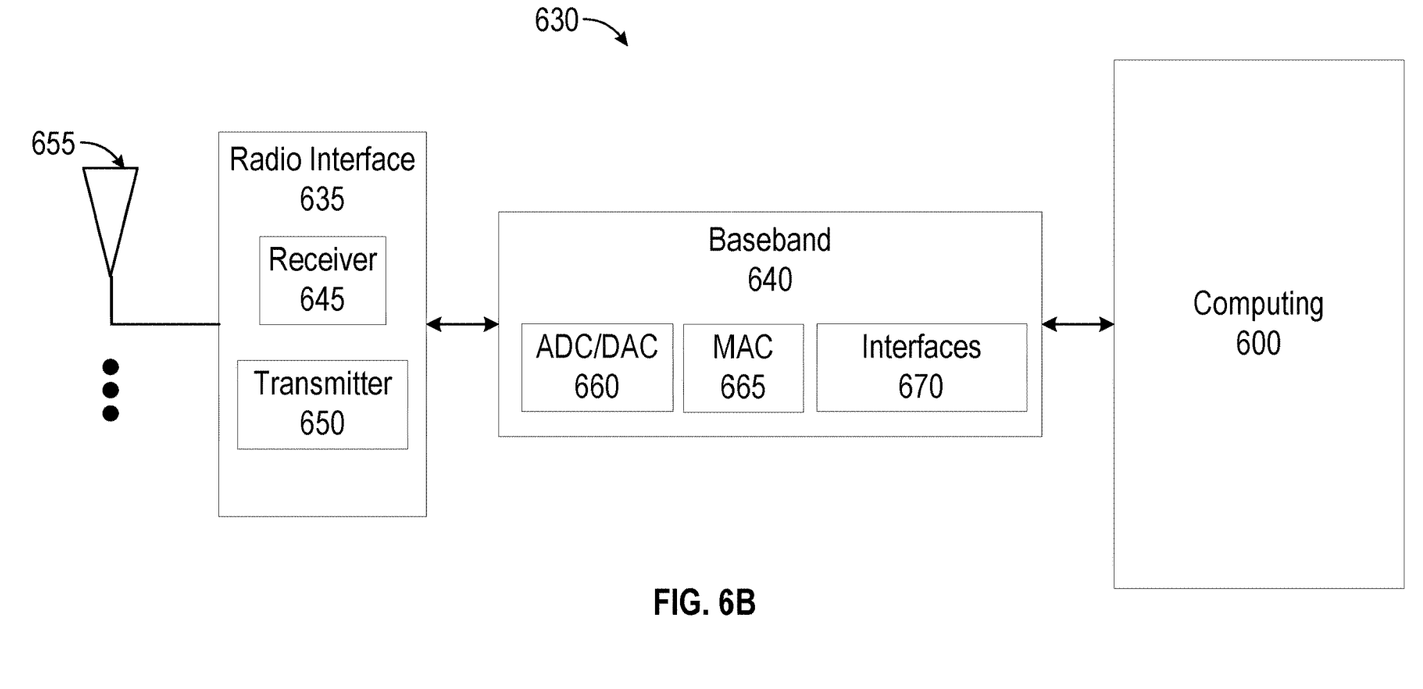
FIG. 6B is a block diagram of a wireless device in accordance with aspects of the present disclosure.

FIG. 6B illustrates an implementation of a communications device 630 that may implement one or more of APs 102, the clients 104, controllers, etc., of FIGS. 1-5. In various implementations, device 630 may comprise a logic circuit. The logic circuit may include physical circuits to perform operations described for one or more of APs 102, the clients 104, controllers, etc., of FIGS. 1-5, for example. As shown in FIG. 6B, device 630 may include one or more of, but is not limited to, a radio interface 635, baseband circuitry 640, and/or computing platform 600.

The device 630 may implement some or all of the structures and/or operations for APs 102, the clients 104, controllers, etc., of FIGS. 1-5, storage medium, and logic circuit in a single computing entity, such as entirely within a single device. Alternatively, the device 630 may distribute portions of the structure and/or operations using a distributed system architecture, such as a client station server architecture, a peer-to-peer architecture, a master-slave architecture, etc.

A radio interface 635, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 635 may include, for example, a receiver 645 and/or a transmitter 650. Radio interface 635 may include bias controls, a crystal oscillator, and/or one or more antennas 655. In additional or alternative configurations, the radio interface 635 may use oscillators and/or one or more filters, as desired.

Baseband circuitry 640 may communicate with radio interface 635 to process, receive, and/or transmit signals and may include, for example, an Analog-To-Digital Converter (ADC) for down converting received signals with a Digital-To-Analog Converter (DAC) 660 for up converting signals for transmission. Further, baseband circuitry 640 may include a baseband or PHYsical layer (PHY) processing circuit for the PHY link layer processing of respective receive/transmit signals. Baseband circuitry 640 may include, for example, a Media Access Control (MAC) processing circuit 665 for MAC/data link layer processing. Baseband circuitry 640 may include a memory controller for communicating with MAC processing circuit 665 and/or a computing platform 600, for example, via one or more interfaces 670.

In some configurations, PHY processing circuit may include a frame construction and/or detection module, in combination with additional circuitry such as a buffer memory, to construct and/or deconstruct communication frames. Alternatively or in addition, MAC processing circuit 665 may share processing for certain of these functions or perform these processes independent of PHY processing circuit. In some configurations, MAC and PHY processing may be integrated into a single circuit.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 600 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   selecting, by an Access Point (AP), a subchannel for a partial sounding based on a minimum bandwidth to conduct the partial sounding;
   sounding, by the AP, the selected subchannel;
   receiving, by the AP, a first Channel State Information (CSI) for a Station (STA) in response to the sounding;
   based on the first CSI from the selected subchannel, extrapolating, by the AP, the first CSI to determine predicted second CSI for a wider bandwidth channel; and
   determining the minimum bandwidth, wherein determining the minimum bandwidth comprises:
      sounding an entire bandwidth;
      receiving third CSI from the STA in response to the sounding of the entire bandwidth;
      extracting a tuple for a path from the third CSI; and
      based on the tuple, determining a time delay, wherein the minimum bandwidth is an inverse of the time delay.

2. The method of claim 1, wherein the selected subchannel is a primary subchannel near a middle of a larger bandwidth of a baseband channel.

3. The method of claim 1, wherein sounding the subchannel comprises:
   broadcasting a Null Data Packet Announcement (NDPA) on the subchannel;

broadcasting a Null Data Packet (NDP) in a Short Interframe Space (SIFS) after the NDPA; and
receiving a Beamforming Report (BFR) from a client in response to the NDP.

4. The method of claim 1, wherein the first CSI from the partial sounding comprises two or more tuples, wherein the two or more tuples are extracted from the first CSI.

5. The method of claim 1, wherein the minimum bandwidth provides resolution between signal peaks in a time delay profile.

6. The method of claim 5, wherein the minimum bandwidth is greater than a bandwidth of the selected subchannel, and wherein at least two subchannels are selected to sound the minimum bandwidth.

7. The method of claim 1, wherein the minimum bandwidth is an inverse of the time delay.

8. The method of claim 7, wherein the time delay is based on a difference between a first estimated distance a first signal traveled and a second estimated distance a second signal traveled.

9. A system comprising:
a memory; and
a processing unit coupled to the memory, wherein the processing unit is operative to:
  select a subchannel for a partial sounding based on a minimum bandwidth to conduct the partial sounding;
  sound the selected subchannel;
  receive a first Channel State Information (CSI) for a Station (STA) in response to the sounding;
  based on the first CSI from the selected subchannel, extrapolate the first CSI to determine predicted second CSI for a wider bandwidth channel; and
  determine the minimum bandwidth, wherein the processing unit being operative to determine the minimum bandwidth comprises the processing unit being operative to:
    sound an entire bandwidth;
    receive third CSI from the STA in response to the sounding of the entire bandwidth;
    extract a tuple for a path from the third CSI; and
    based on the tuple, determine a time delay, wherein the minimum bandwidth is an inverse of the time delay.

10. The system of claim 9, wherein sounding the subchannel comprises:
broadcasting a Null Data Packet Announcement (NDPA) on the subchannel;
broadcasting a Null Data Packet (NDP) in a Short Interframe Space (SIFS) after the NDPA; and
receiving a Beamforming Report (BFR) from a client in response to the NDP.

11. The system of claim 9, wherein the minimum bandwidth provides resolution between signal peaks in a time delay profile.

12. The system of claim 9, wherein the minimum bandwidth is greater than a bandwidth of the selected subchannel, and wherein at least two subchannels are selected to sound the minimum bandwidth.

13. The system of claim 9, wherein the processing unit is further operative to: determine the minimum bandwidth, wherein determining the minimum bandwidth comprises:
sounding an entire bandwidth;
receiving third CSI from the STA in response to the sounding of the entire bandwidth;
extracting a tuple for a path from the third CSI; and
based on the tuple, determining a time delay, wherein the minimum bandwidth is an inverse of the time delay.

14. A non-transitory computer-readable medium that stores a set of instructions which when executed perform a method executed by the set of instructions comprising:
selecting a subchannel for a partial sounding based on a minimum bandwidth to conduct the partial sounding;
sounding the selected subchannel;
receiving first Channel State Information (CSI) for a Station (STA) in response to the sounding;
based on the first CSI from the selected subchannel, extrapolating the first CSI to determine predicted second CSI for a wider bandwidth channel; and
determining the minimum bandwidth, wherein determining the minimum bandwidth comprises:
  sounding an entire bandwidth;
  receiving third CSI from the STA in response to the sounding of the entire bandwidth;
  extracting a tuple for a path from the third CSI; and
  based on the tuple, determining a time delay, wherein the minimum bandwidth is an inverse of the time delay.

15. The non-transitory computer-readable medium of claim 14, wherein the selected subchannel is a primary subchannel near a middle of a larger bandwidth of a baseband channel.

16. The non-transitory computer-readable medium of claim 14, wherein the first CSI from the partial sounding comprises two or more tuples, wherein the two or more tuples are extracted from the first CSI.

17. The non-transitory computer-readable medium of claim 14, wherein the minimum bandwidth provides resolution between peaks in a time delay profile to identify a minimum delay separation between reflectors.

18. The non-transitory computer-readable medium of claim 14, wherein the minimum bandwidth is greater than a bandwidth of the selected subchannel, and wherein at least two subchannels are selected to sound the minimum bandwidth.

* * * * *